July 25, 1944.    G. W. NEWTON ET AL    2,354,219
SPRING SUSPENSION
Filed June 16, 1937
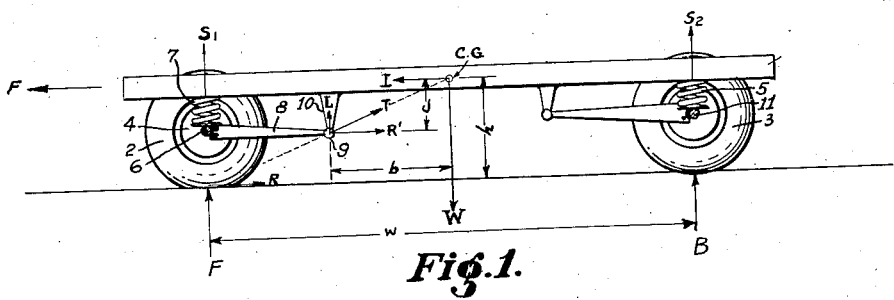
Fig.1.
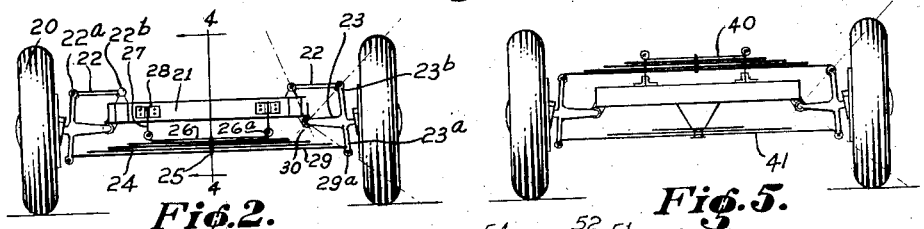
Fig.2.    Fig.5.
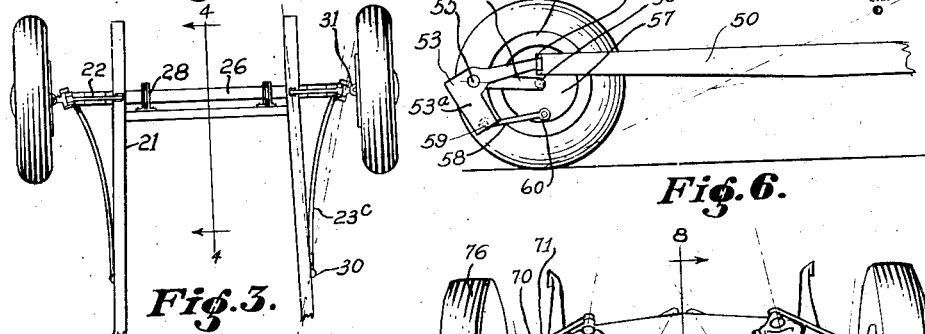
Fig.3.    Fig.6.    Fig.7.
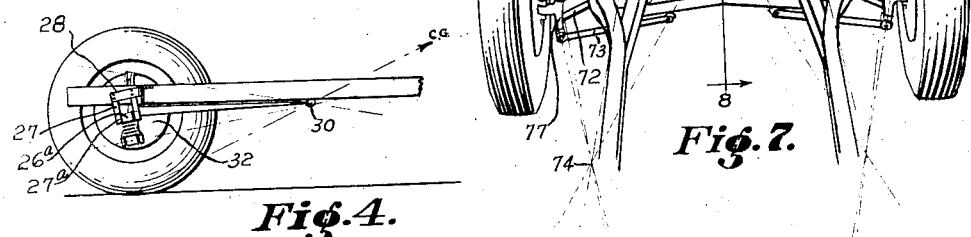
Fig.4.
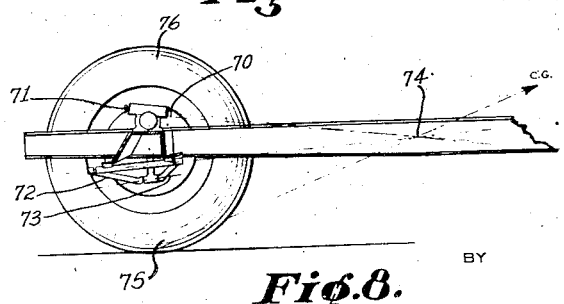
Fig.8.
INVENTORS
Gaylord W. Newton
Paul Heftler
BY    Paul Heftler
ATTORNEY Patented July 25, 1944

2,354,219

UNITED STATES PATENT OFFICE 2,354,219

SPRING SUSPENSION

Gaylord W. Newton, Seattle, Wash., and Paul Heftler, Grosse Pointe Park, Mich.

Application June 16, 1937, Serial No. 148,552
In Canada August 20, 1936

32 Claims. (Cl. 280—124)

What the inventions are about

These inventions, including the principal one and the several related inventions which embody the principal one, relate to the spring suspension of vehicles, particularly automobiles. Their main object is the provision of front spring suspensions for automobiles which will be as soft and as comfortable to ride on as the independent springing or "knee action" on the automobiles introduced to the public in the United States in 1934, but which will not make the car nose down when the brakes are applied.

As is well known, when an ordinary automobile is moving forward and its brakes are applied, some of the weight of the car is taken from the rear wheels and thrown forward onto the front wheels. This lets the rear springs lift up the rear of the car, and it compresses the front springs, so that car rears up and noses down. In the cars made in this country before 1934, the nosing down and rearing up was not too bad because the springs of those cars were so stiff (front springs generally having an initial deflection of less than three inches) that these movements were small. In 1934, the adoption of independent springing largely eliminated the possibility of tramp and shimmy, and allowed the front springing to be made two or three times as soft as before. At the same time, the rear springs were made softer. This greatly increased the comfort of the car, but allowed the car to rear up and nose down two or three times as much, so that these movements were quite noticeable. The nosing down during a sudden stop is especially objectionable because it tips the seat forward so that a passenger riding in a car, especially one with leather upholstery, is apt to slide off the seat onto the floor, and in an emergency stop ending in collision with a car ahead, the bumper, at the moment of impact, is several inches lower than its normal position and goes under the other car's rear bumper, which neatly crumples the front fenders and radiator grille of the colliding car.

Another object of these inventions is to provide front and rear spring suspensions which may differ from various suspensions already known only in their proportions or in the angles of their pivots, but in which these proportions and angles are so chosen that application of the brakes on all four wheels does not cause the car to nose down or rear up.

Another object of some of these inventions is the provision of spring suspensions in which the parts are designed and arranged so that couples acting on pivot pins in spring shackles and elsewhere are substantially eliminated, thus greatly reducing wear on those parts.

What the inventions are

The principal invention is really a discovery; it is the discovery that if the brake and spring suspension linkages of an automobile are proportioned in a certain way, nosing down and rearing up when the brakes are applied will be eliminated. In the simplest case, in a car in which the center of gravity is halfway between the front and rear wheels and the brakes are arranged so that they are all applied equally hard, these linkages should be proportioned so that, when the wheels are locked by the brakes and any wheel is moved up and down relative to the rest of the car, a spot on the bottom of that wheel will not move straight up and down but will move on a slant, and its line of movement, as seen from the side of the car, will be perpendicular to a line drawn from the bottom of the wheel to the center of gravity of the car. In the ordinary automobile, in which each brake anchor plate is fixed to an axle or to a steering knuckle, the spring suspension linkages act also as the linkages for holding the brakes from spinning around with the wheels, and they are therefore the only linkages that must be proportioned correctly to make the spots on the bottoms of the locked wheels move along the lines specified. Thus the invention may be regarded as an improvement in spring suspensions alone, and it may be carried out by changing only the proportions and angles of the spring suspension of an ordinary automobile.

The invention, as just described, is a special and simple example that conforms also to a more general rule or principle: the linkages are proportioned so that, when the wheels are locked by the brakes and any wheel is moved up and down, a spot on the bottom of the wheel moves on a slant, and its line of movement, as seen from the side of the car, is perpendicular to a line drawn from the bottom of the wheel to a point at the same height as the center of gravity of the car and spaced between the front and rear wheels in the same proportion as the braking effort is divided between the front and rear wheels. In the special case first described, this point is the same as the center of gravity because the center of gravity is halfway between the wheels and the braking effort is divided evenly between the front and rear wheels, but in other cases this point may be ahead of or behind the center of gravity.

The principal invention described above in a general way can be applied to the spring suspensions of almost any design of automobile. In some cases, no further invention will be required, and the information given here will be enough to enable a good engineer or designer to apply the invention. In other cases, additional inventions will be needed, and some of these are described below. Others are described in U. S. Patent No. 2,254,287 and in the pending U. S. Patent application Ser. No. 160,712, now Patent No. 2,334,702, dated Nov. 23, 1943.

*The drawings*

Figure 1 is a diagram of a car illustrating the principle of the invention.

Figure 2 is a diagrammatic front view of the front end of a car with one form of the invention.

Figure 3 is a diagrammatic plan view of what is shown in Fig. 2.

Figure 4 is a diagrammatic central vertical section of what is shown in Figs. 2 and 3, the section being taken on the line 4—4.

Figure 5 is a diagrammatic front view similar to Fig. 2 but showing another form of the invention.

Figure 6 is a diagrammatic central vertical section of the front end of a car showing still another form of the invention.

Figure 7 is a diagrammatic perspective view looking down and forward at the front end of a car showing yet another form of the invention.

Figure 8 is a diagrammatic central vertical section of the front end of the car shown in Fig. 7, taken on the line 8—8.

*Why the invention works*

The most important thing about this invention is that it works. It has been applied to an automobile and thoroughly tested, and it works. When the brakes on a moving automobile are applied, the weight of the car is thrown forward more onto the front wheels and less on the rear wheels. At the same time, the brakes not only tend to stop the wheels from turning, but the wheels tend to make the brakes turn around with the wheels. It is possible to arrange the brake and suspension linkages so that, when the front brakes tend to turn with the front wheels, the linkages that keep them from turning and that keep the front wheels from sliding back under the car will push up on the front of the car just hard enough to carry the extra weight thrown onto the front wheels. This extra weight then will not be carried by the springs, the springs will not deflect any more than before the brakes were applied, and the car will not nose down. In the same way, the linkages that keep the rear brakes from turning around with the wheels and that hold the rear wheels from sliding out from under the car can be arranged to pull down on the back of the car just hard enough to make up for the weight that was taken off the rear wheels and thrown onto the front wheels. The rear springs will then have to support the same force as before the brakes were applied, and the car will not rear up. If the arrangement works when the brakes are applied easily, it will work when they are applied twice as hard, for, although twice as much weight will be shifted from the rear wheels to the front wheels, the lifting force at the front and the pulling-down force at the rear will be twice as great, and everything will stay in balance.

In the above explanation, the term "weight" is used in its every day meaning, and it includes both what is measured by the scales that a person stands on to weigh himself and what that person throws against a door that is struck in order to force it open. Defined scientifically, it is the vector sum of the forces of gravity and inertia. Since, in spite of simple explanations like the above, some outstanding automotive engineers have though that the invention was impossible, a mathematical proof that it works is given below.

Consider the simple automobile shown diagrammatically in Fig. 1. In this figure, the parts, such as the frame and body, which are carried by the springs and are the "sprung weight," are represented by the solid rectangular block 1. Many of the other parts, which are on both sides of the car, are shown for simplicity on only one side, but they represent those on both.

The main or spring supported part 1 of the car is carried on front and rear wheels 2 and 3 mounted on conventional front and rear axles 6 and 11. Each front wheel has a braking mechanism, whose principal parts, except the brake drum, are mounted on the brake backing plate 4. A coil spring 7, which serves only to support the car, is under compression between the axle and the frame. A torque arm 8, which is shown for simplicity as being secured directly to the brake backing plate 4 (as on the rear axle of the "Ford"), would in reality be secured to it indirectly through the front axle and a steering knuckle (as on the front axle of the "Ford" automobile). The torque arm 8 keeps the brake bracking plate 4 and the brake mechanism carried by the backing plate from rotating with the brake drum when the brake is applied. The rear end of the torque arm 8 is held by a universal or ball and socket joint 9 carried by a bracket 10 on the frame 1. The ball and socket joint lies at any convenient point, not too close to the ground, in the plane passing through the center of gravity or C. G. of the vehicle and the centers of the areas of contact of the two front wheels with the ground. This plane is seen on edge and is represented by the dotted line, and it is shown correctly for a car having a 120 inch wheelbase and a center of gravity 24 inches above the road and in the center of the wheelbase.

Assume the car to be rolling to the left and the front brakes to be applied, giving a known constant retarding force R applied to the wheels at the level of the road. Three distinct forces will then be acting on the front wheel, axle, and torque arm assembly, namely, the pressure of the spring 7 which can push only straight down but whose magnitude is unknown, a force T acting on the end of the torque arm 8 at the ball and socket joint 9, whose direction and magnitude are unknown, and the force of the ground at the tire, whose direction and magnitude are also unknown. However, this last force is composed of the upward pressure F which carries the weight of the car on the front wheels and the known retarding force or component R. The pressure F is not known yet because, when a car is stopping, its weight is thrown forward more onto the front wheels than ordinarily. The retarding component R, the points at which the three forces act, and the direction of the pressure of the spring are known. Since, when the only three forces acting on a body are in equilibrium, the three always pass through one point, and since two of the three forces being considered now, namely, the pressure of the spring and the combined pressure and retarding force or friction at the ground, are known to pass through the place where the tire touches the ground, the third force must also pass through that place. Hence, the force on the end of the torque arm and its reaction T on the frame lie on the plane through the C. G., represented by the dotted line. Since only the force at the ground and the force at the ball and socket joint have horizontal components, the horizontal push R' at the ball and socket joint is equal to the retarding force R. In other words, the entire braking force R is transmitted as the horizontal component R' of the total thrust T on the car at the ball joint 9. Since the direction of T and the direction and magnitude of its horizontal component are known, both T and the vertical component L are known. Of the six forces or components acting on the car, namely, the pull of gravity or weight W, the retarding component R', the lifting component L, the force of inertia I equal to R' and to R, and the upward pressures $S_1$ and $S_2$ of the two springs, all but the separate amounts of the last two are thus known.

R' and I form a couple tending to rotate the car forward, and L and a portion of W equal to L form a couple tending to rotate the car backward. These two couples are $R'c$ and $Lb$, respectively. But, by similar triangles, $L:R'::c:b$. Therefore, $R'c=Lb$ and the two couples neutralize each other. The remaining forces, namely, what is left of W (equal to $W-L$), $S_1$ and $S_2$ must be in balance. Since W is halfway between $S_1$ and $S_2$, each of the latter two is equal to half of $W-L$. The pressure on each spring is less than its normal pressure $$\frac{W}{2}$$

by an amount equal to $$\frac{L}{2}$$

The two springs must therefore be a little less compressed than normally, and, if they are equally soft, both ends of the car are lifted the same amount above their normal positions. The only effect of putting on the front brakes is to slow down the car and lift it slightly. There is no nosing down. The action of the rear brakes is similar except that the car is lowered instead of lifted. If the front and rear braking forces are equal in the car shown, the lifting and lowering forces will be equal and will neutralize each other.

The analysis given above proves that nose diving and rearing-up can be prevented, but it does not prove that any arrangement besides the particular one shown in Figure 1 will do it. This arrangement is the simplest example of a car with linkages proportioned according to the general principle set forth above in the section of this specification entitled "What The Inventions Are", and it is possible to prove that any linkages so proportioned will work in the same way.

Consider first the effect of the forces that act on a wheel from the ground, and, to simplify the analysis, assume that all of the weight of the car is on the frame and that there is no friction except in the brakes and between the wheel and the ground. When the brakes are not applied and the car is rolling straight ahead on a level road, the only force acting from the ground to a wheel is a force pushing straight up and equal to the part of the weight of the car that is on that wheel. This force is transmitted to the suspension through the wheel bearings, and it acts on the suspension just as if it acted on it directly instead of through the wheel.

When the brakes are applied, there is a change in the weight carried by the wheel and in the upward pressure of the ground on the wheel, and this change in upward pressure acts on the suspension just like the original upward pressure. There is also a retarding force acting horizontally from the ground on the bottom of the wheel, and this force is transmitted by the brakes to the brake and suspension linkage just as if the wheel were locked by the brake.

The fact that the wheel is being permitted to turn by the sliding of the brake drum on the brake shoes does not change the fact that all of the retarding force acting on the wheel is transmitted to the brake and suspension linkages; this force acts on those linkages just as if the wheel were locked by the brake. That this is so can be seen by considering a car rolling slowly downhill with its brakes applied just enough to prevent the speed from increasing. Exactly how fast the car is rolling makes no difference in the forces acting on its various parts; the only difference is that more energy is dissipated as heat in the brakes when the car is rolling faster. If the speed of the car is reduced so slowly that the effect of inertia is negligible, the forces will not change, and they will still be the same when the speed becomes nothing. At this point, the wheels become locked by the brakes, and the forces are still the same as when the wheels were rolling; therefore the forces when the wheels are rolling are just the same as if they were locked and if the same retarding force were applied to them from the ground.

Consider again a car rolling straight ahead on a level road and let:

$w$=the wheelbase,
$h$=the height of the center of gravity, and, when the brakes are applied, $R_1$=the retarding force on the front wheels,
$R_2$=the retarding force on the rear wheels,
$dG$=the change in the pressure of the ground up against the front wheels.

When the brakes are applied, the retarding forces $R_1$ and $R_2$ will act horizontally at the level of the ground, and the inertia of the car will act horizontally at the distance $h$ above the ground. These will form a couple $h(R_1+R_2)$ tending to tip the entire car forward and throwing more of the weight onto the front wheels, and this couple and the shift in weight will be balanced by an increase $+dG$ in the pressure of the ground up against the front wheels and a decrease $-dG$ in the pressure of the ground up against the rear wheels. Therefore, $$wdG=h(R_1+R_2)$$

or $$dG=\frac{h}{w}(R_1+R_2)$$

The total new force acting from the ground to the front wheels is thus formed of a horizontal component $R_1$ and a vertical component $$\frac{h}{w}(R_1+R_2)$$

and it therefore acts along a line which slopes up and back at an angle to the horizontal whose tangent is $$\frac{h(R_1+R_2)}{wR_1}$$

The force with which the car acts on the front wheels through the brake and suspension linkages is equal and opposite to this, and it acts along the same line. If these linkages are such that, when the brakes are locked, the spots on the bottoms of the wheels, as seen from the side, move at right angles to this line, these opposing forces will be transmitted entirely by the linkages, and there will be no component acting to cause movement in the linkages or to change the compression of the front springs. With such linkages, the front of the car remains steady and does not nose dive.

At the rear of the car, proportioning the linkages according to the principles given above will similarly cause all of the new forces that come into being when the brakes are applied to be transmitted entirely by the linkages, and the car will not rear up.

The simple spring suspensions shown in Figure 1 are merely representative, and, in putting the invention into practice, one can use any brake and suspension linkages that will guide the spots on the bottoms of the wheels along the paths specified above when the brakes are locked and the wheels moved up and down. A few such arrangements are shown in Figures 2 to 8 and are described below, the particular proportions given being for a car with the weight and the braking effort divided equally between the front and rear wheels.

First front suspension

One form of spring suspension, shown diagrammatically in Figures 2, 3, and 4, comprises a pair of wheels 20 secured to an automobile frame 21 by means of links 22, combined torque and knuckle arms 23, and a spring 24. The spring 24 is a transverse horizontal leaf spring comprising series of superimposed leaves of graduated length secured together at the center against relative longitudinal movement. The central sesuring means 25 may be a bolt or it may be a series of nesting humps in the center of the spring held together by a clamp. The top spring leaf 26 is of a substantial length and has its ends curled up to form eyes 26a by means of which the spring is secured to the frame. Since flexing of the spring causes the distance between the eyes 26a to change, they are not fastened directly to the frame, but each eye is pivoted on a pin whose ends are carried by eyes 27a on the lower ends of a pair of short springs 27 depending from brackets 28 on the frame 21. The short depending springs 27 may be single leaves or may be main leaves with shorter leaves on each side to stiffen and strengthen them. The bottom spring leaf 29 is long enough to extend across from near one wheel to near the other, and the lengths of the intermediate leaves lie between the lengths of the top and bottom ones. Suitable spring clips, not shown in the drawing, are provided, especially just inside the ends of the top leaf.

The ends of the bottom or main spring leaf 29 are formed into eyes 29a which are pivoted to the lower ends 23a of the knuckle arms. The upper ends 23b of the knuckle arms are pivoted to the outer ends 22a of the transverse links 22 whose inner ends 22b are pivoted to the frame. The knuckle arms 23 are formed integrally with or are secured to torque and radius arms 23c, which extend back to ball and socket or other form of universal joints 30 on the frame and which are so shaped and positioned as to allow the wheels to be steered. The combined knuckle and torque arms 23 carry the conventional steering knuckles 31 on which are carried the wheel spindle rotatably carrying the wheel 20 and non-rotatably connected to the brake backing plate 32. Any conventional mechanisms may be used to actuate the brakes and steer the wheels.

The universal joints 30 are on or near the plane which passes through the center of gravity of the car and through the places where the wheels or tires 20 rest on the road. This arrangement prevents application of the front brakes from making the car nose down. The pivots at both ends 22a and 22b of each link 22 and at the ends 29a of the main spring leaf 29 are oriented so that every one of their axes, if prolonged, passes through the ball joint 30 on its side of the car, and the leaves of the spring 24 lie in planes parallel to the pivots at the end of the main leaf 29, as shown in Figure 4. This prevents binding at the pivots and greatly reduces wear. The link 22 is shorter than the distance between the ends 26a and 29a of the top and bottom spring leaves so that the bottom of the wheel or tire 20 will move in a longitudinal vertical plane.

The pivots may be "Silentblock" or similar rubber bushings, or may be similar to other spring pivots used on cars. If desired, the spring may be secured to the frame 21 in other ways, and it may be a simple transverse spring secured at the center as in the "Ford." The ball and socket joints may be ordinary metal ones or rubber lined ones, and they may be spaced closer together than shown. Their best spacing is probably about equal to the distance between the two pivots on the ends 26a of the top spring leaf plus half the distance between the pivots on the ends 26a and 29a, respectively, of the top and bottom leaves at one end of the spring. With this spacing, there is no twisting of the spring as the wheel moves up and down.

Second front suspension

The second form of spring suspension, shown in Figure 5, is generally similar to the first one shown in Figures 2, 3, and 4. It differs from it in that the upper link is replaced by a spring 40 which is similar to the spring 24 in the first suspension, and in that the spring 24 of the first suspension is replaced by a spring 41 secured to the frame at its center. The prolonged axes of the pivots again pass through the ball and socket joint at the end of the torque arm, and the leaves of each spring lie in planes parallel to the pivots at its ends as before. With the two springs, there are two pivots less than in the first suspension, and the different types of springs above and below constrain the bottom of the wheel to move in a longitudinal vertical plane.

Third front suspension

The third form of spring suspension is an improvement on the Dubonnet "knee action," some examples of which are shown in British Patent No. 413.913, and is shown diagrammatically in Figure 6. In this form of spring suspension, the steering knuckle 51 is mounted directly on the frame 50 of the car and the springs and shock absorbers steer with the wheels 52. A rigid arm and spring housing 53 is pivotally carried by the approximately vertical steering knuckle 51, and in turn carries a wheel carrying arm 54 mounted on a horizontal shaft 55 extending into the spring housing perpendicular to the plane of the wheels. The other end of the arm 54 carries the wheel 52 on a wheel spindle 56 parallel to the shaft 55.

The spring housing 53a encloses a coil spring, which acts on the shaft 55 to resiliently urge the wheel down with respect to the steering knuckle 51, and suitable shock absorbing mechanism. The brake backing plate 57 is rotatably mounted on the wheel spindle concentric with the wheel 52 and the link 58 prevents it from spinning around with the wheel when the brakes are applied. The link 58, instead of being parallel to the arm 54 as is conventional, is at an angle to it, so that a plane passed through the axes of the shaft 55 and the spindle 56 intersects a plane through the axes of the pivots 59 and 60 of the link 58 in a line which lies approximately in the plane through the center of gravity, C. G., of the car and the spots where the front wheels touch the ground. The line of intersection of the planes through the axes of the pivots is the instantaneous center around which the brake backing plate rotates. If desired, this instantaneous center can be made to stay very close to the plane through the center of gravity by making the lower link longer than the upper arm. The proper length can be computed for any location of pivots on the brake backing plate but it can more readily be found by trial and error plotting. If the link is placed above the arm, the link is shorter and does not project forward objectionably.

*Fourth front suspension*

The fourth form of spring suspension, an improvement on the widely used "double wishbone" type of "knee action," is shown in Figures 7 and 8. The particular embodiment illustrated more or less diagrammatically is exactly like that used in the 1934 "Oldsmobile," except that the links 70, 71, 72, and 73, forming the wishbones, and their pivots and supports are so shaped and arranged that the four axes of the pivots (one axis at each end of each wishbone) associated with each wheel all intersect in points 74 which lie on the plane through the point of contact 75 of the front wheels 76 with the ground and through the center of gravity. This is clearly shown in the figures and prevents the application of the front brakes from causing the car to nose down.

Numerous modifications of this fourth form of spring suspension may be made. The points 74 may be farther back up the plane through the center of gravity or not so far back, or they may be farther out towards the side of the car, such as directly behind each front wheel. The bases of the wishbones may be made much wider, with the ends of the links which are pivoted to the frame spaced much farther apart, and the back leg of the lower wishbone may be pivoted to the side of the frame instead of to the cross member as shown. Different forms of springs may be used in place of a coil spring acting on the lower wishbone. A transverse leaf spring may be used, the ends of the spring being shackled to the outer ends of the lower wishbones 72, 73, or directly to the knuckle arms 77. Bars in torsion, lying along the axes of either the inner ends of the upper or lower wishbones or both, and having one end fixed to a wishbone and the other fixed to the frame, may be used as springs. In such a case, the link to which the rotating end of the torsion bar is fixed should be approximately perpendicular to the axis of the bar to minimize bending stresses in the bar and twisting stresses in the link.

Besides the numerous spring suspensions that have been disclosed above, the one invention embodied in them all can be embodied in other spring suspensions. Many of these are described in the application for the present patent, as originally filed in the U. S. Patent Office, and this application may be consulted by anyone. Other modifications, some obvious, and some involving additional invention, may be made, so this patent is not to be understood as being limited to the specific embodiments described, illustrated, or only mentioned herein, but the scope of the patent is to be as broad as the inventions as described in the following claims. (In these claims the term "frame" means the main part of the car which supports the passengers, and includes the frame and the body or their equivalents. The term "spindle" means "spindle," "stub axle," "axle end," or any other member on which a wheel turns. Similarly, other terms include their equivalents.)

We claim, therefore, as our inventions:

1. In a vehicle, a frame, a wheel supporting member resiliently movable up and down with respect to the frame, a ground engaging wheel rotatably supported by the wheel supporting member, a brake mechanism anchor member movable up and down with the wheel, brake mechanism to frictionally resist rotation of the wheel relative to the brake anchor member, and means connecting the wheel supporting member and the brake anchor member to the frame so that the instantaneous center of rotation of the brake anchor member when it moves up and down lies in a plane which passes through the center of gravity of the vehicle and the point of contact of the ground with the wheel and which is symmetrically disposed with respect to the direction of motion of the vehicle.

2. In an automobile, a frame, wheels resiliently supporting the body and movable up and down with respect thereto, brake connected to the wheels to offer controlled resistance to their rotation with respect to the body, and means connecting the brakes, the wheels, and the body in such a way that when the brakes are locked and the wheels are moved up and down with respect to the body, a point on the bottom of each wheel moves in a path which is tangent to a cylinder whose axis passes through the center of gravity of the car and is horizontal and perpendicular to the axis of the car.

3. In a vehicle, a frame, a plurality of normally approximately horizontal and parallel spindles connected to the frame, wheels rotatably mounted on the spindles to support the vehicle on the ground, one of the spindles being movable up and down with respect to the frame and having resilient means to urge it down, and braking means, able when actuated to frictionally resist and to stop the rotation of the wheel on that spindle, the connection between that spindle, the braking means, and the frame being such that, when the wheel is stopped from rotating by the braking means and is moved up or down with respect to the frame, a plane perpendicular to the path of and through a point on the bottom of the wheel will pass near the center of gravity of the wheel.

4. In a vehicle, a frame, a wheel supporting member resiliently movable up and down with respect to the frame, a ground engaging wheel rotatably supported by the wheel supporting member, a brake mechanism anchor member movable up and down with the wheel, brake mechanism to frictionally resist rotation of the wheel relative to the brake anchor member, and means connecting the wheel supporting member and the brake anchor member to the frame so that the instantaneous center of rotation of the brake anchor member when it moves up and down lies on a plane which passes through the point of contact of the wheel with the ground and near the center of gravity of the vehicle and which is symmetrically disposed with respect to the direction of motion of the vehicle.

5. A vehicle comprising a frame, a wheel carrying member secured to the frame by a universal joint, a ground engaging wheel on the wheel carrying member, a pair of leaf springs carried by the frame and pivoted to the member, the axes of the pivots between the springs and the member both passing through the universal joint.

6. In a vehicle, a frame, an upright king pin support near one end of the vehicle, a king pin carried by said support, a steering knuckle rotatable on said king pin, a ground engaging wheel rotatably mounted on said steering knuckle, braking mechanism for said wheel including a backing plate fixed to said steering knuckle, an upper link member connected to the frame and to the top of the king pin support, and a lower link member connected to the frame and to the bottom of the king pin support, said link members extending transversely and substantially horizontally and their connections to the king pin support being by pivots having definite axes which converge towards a point which is nearer to the other end of the vehicle and nearer to the longitudinal center line of the vehicle than is the king pin support.

7. A wheel suspension as described in claim 6 in which at least one of said link members is a leaf spring.

8. A wheel suspension as described in claim 6 in which at least one of said link members is a leaf spring pivotally connected to the frame at spaced points.

9. A wheel suspension as described in claim 6 in which at least one of said link members is a leaf spring pivotally connected to the frame at spaced points by pivots resiliently fixed to the frame.

10. A wheel suspension as described in claim 6 in which said upper link member is a leaf spring pivotally connected to the frame at points spaced along its length and in which said lower link member is a leaf spring fixed to the frame.

11. A wheel suspension as described in claim 6 in which at least one of said link members is a rigid link and its connection to the frame is by a pivot whose axis passes through the same point as the axes of the other pivots.

12. A wheel suspension as described in claim 6 in which said link members are rigid links and their connection to the frame is by pivots whose axes also intersect in said point.

13. A wheel suspension as described in claim 6 in which at least one of said link members is a rigid member pivoted to the frame at points spaced along an axis passing through the same point as the axes of the other pivots.

14. A wheel suspension as described in claim 6 in which both of said link members are rigid members each pivoted to the frame at points spaced along an axis passing through the same point as the axes of the other pivots.

15. A wheel suspension as described in claim 6 in which the king pin support has a torque arm rigidly secured to it and pivoted to the frame at the point where the axes of said other pivots meet.

16. In a vehicle, a frame, an upright king pin support, a king pin carried by said support, a steering knuckle rotatable on said king pin, a ground engaging wheel rotatably mounted on said steering knuckle, braking mechanism for said wheel including a backing plate fixed to said steering knuckle, a rigid upper link connected to the top of the king pin support and to the frame by pivots having definite axes, and a rigid lower link connected to the bottom of the king pin support and to the frame by pivots having definite axes, said links extending transversely and substantially horizontally and the axes of their pivots intersecting at a single point.

17. A wheel suspension as described in claim 16 in which at least one of said links is an assembly pivoted to the frame at spaced points.

18. A wheel suspension as described in claim 16 in which at least one of said links is an assembly pivoted to the frame at spaced points and pivoted to the king pin support at spaced points.

19. A wheel suspension as described in claim 16 in which both of said links are assemblies each pivoted to the frame at spaced points.

20. In a vehicle having independent suspension of a pair of road wheels of which each road wheel is mounted on a wheel support member which is pivotally mounted between the outer ends of upper and lower laterally extending links, fixed determinate pivot axes for the inner ends of said upper and lower links on the vehicle frame arranged in non-parallel relationship longitudinally of the vehicle and divergent away from the vertical transverse plane of the center of gravity thereof, whereby the said links are constrained to move upwardly or downwardly in fixed independent non-parallel planes, transverse to the longitudinal axis of the vehicle.

21. In a vehicle having independent suspension of a pair of road wheels of which each road wheel is mounted on a wheel support member which is pivotally mounted between the outer ends of upper and lower laterally extending links, fixed determinate pivot axes for the inner ends of said upper and lower links on the vehicle frame arranged in non-parallel relationship longitudinally of the vehicle whereby upon an upward deflection of the wheel relatively to the frame, an assumed fixed point on the wheel moves at an angle, longitudinally of the vehicle in a direction outwardly and upwardly away from the vertical transverse plane of the center of gravity of the vehicle.

22. In a vehicle having independent suspension of a pair of road wheels and in which each of said road wheels is mounted on an upright wheel support member whose upper end is pivoted to the outer end of an upper laterally extending link and whose lower end is pivoted to the outer end of a lower laterally extending link, a pivotal connection between each of said links and the main part of said vehicle, each link and its pivotal connection being strong and rigid enough to form the sole guiding means for the end of the wheel support member pivoted thereto, and the axes of said pivotal connections being arranged in non-parallel relation longitudinally of the vehicle and divergent away from the transverse plane of the center of gravity thereof, whereby the outer ends of said links are constrained to move up or down in fixed independent non-parallel planes transverse to the longitudinal axis of the vehicle.

23. In a vehicle having independent suspension of a pair of road wheels and in which each of said road wheels is mounted on an upright wheel support member whose upper end is pivoted to the outer end of an upper laterally extending link and whose lower end is pivoted to the outer end of a lower laterally extending link, a pivotal connection between each of said links and the main part of said vehicle, and means for preventing rotation of the wheel support member about an axis passing through its ends, each link and its pivotal connection being strong and rigid enough to form the sole guiding means for the end of the wheel support member pivoted thereto, and the axes of said pivotal connections being arranged in non-parallel relation longitudinally of the vehicle and divergent away from the transverse plane of the center of gravity thereof, whereby upon an upward deflection of the wheel and wheel support member relative to the main part of the vehicle with the wheel prevented from rotating relative to the wheel support member, a spot on the bottom of the wheel moves up at an angle away from the vertical transverse plane of the center of gravity of the vehicle.

24. In independent suspensions of the type in which an upright wheel support is pivoted to the ends of a pair of vertically spaced wishbones or similar rigid arms swinging about non-parallel axes, the improvement which consists in arranging the suspension so that two planes, each plane passing through the axis of swinging and the end of one wishbone or arm, will intersect in an approximately horizontal line.

25. In a vehicle having independent suspension of a pair of road wheels of which each road wheel is mounted on a wheel support member which is pivotally mounted between the outer ends of upper and lower laterally extending links, fixed determinate pivot axes for the inner ends of said upper and lower links on the vehicle frame arranged in non-parallel relationship longitudinally of the vehicle and divergent away from the vertical transverse plane of the center of gravity thereof.

26. In a vehicle having independent suspension of a pair of road wheels of which each road wheel is mounted on a wheel support member which is pivotally mounted between the outer ends of upper and lower laterally extending links, fixed determinate pivot axes for the inner ends of said upper and lower links on the vehicle frame arranged in non-parallel relationship longitudinally of the vehicle.

27. In a vehicle having a frame resiliently supported on two pairs of wheels and provided with brakes on all four wheels, a linkage interconnecting one pair of wheels and its brakes and the frame and proportioned so that the retarding force caused by the brakes on that pair of wheels and the change in the pressure of the ground under those wheels when the brakes are applied and shift the effective weight of the vehicle a little from the rear wheels to the front wheels are transmitted to the frame entirely by the linkage as a single resultant force acting through a point between the spots where that pair of wheels touches the ground and at an angle to the horizontal whose tangent is equal to the height of the center of gravity of the vehicle divided by the product of the wheelbase of the vehicle and the fraction of the total braking effort that is applied to that pair of wheels.

28. In a vehicle, a frame, an upright wheel support near one end of the vehicle, a wheel on the wheel support, and means connecting the wheel support to the frame, the connecting means including a rigid link connected directly to the wheel support and to the frame by pivots having definite axes which converge towards the other end of the vehicle.

29. In a vehicle, a frame, an upright wheel support beside the frame near one end of the vehicle, a wheel on the wheel support, and upper and lower links extending out from the frame to the wheel support, at least one of the links being connected directly to one end of the wheel support and to the frame by pivots having definite axes which converge towards the other end of the vehicle.

30. In a vehicle, a frame, an upright wheel support near one end of the vehicle, a wheel on the wheel support, and means connecting the wheel support to the frame, the connecting means including a rigid link connected directly to one end of the wheel support and to the frame by pivots having definite axes which converge towards the other end of the vehicle, and a member acting as a second link and connecting the other end of the wheel support to the frame.

31. In a motor vehicle, a frame, a pair of wheels near one end of the vehicle, springs for supporting the frame on the wheels, brake drums connected to rotate with the wheels, brake anchor plates associated with the brake drums, and linkages connecting the anchor plates and the wheels and the frame, the linkages being proportioned so that, when the brake drums are locked to the brake anchor plates and the wheels are moved up and down with respect to the frame, the paths of points on the bottoms of the wheels will be tangent to or lie in a plane passing through those points in their mid-positions and sloping up and away from the center of gravity of the vehicle at an angle to the vertical whose tangent is equal to the height of the center of gravity divided by the product of the wheelbase and the fraction of the braking effort applied to that pair of wheels.

32. In a vehicle having a frame spring supported on front and rear wheels and having front and rear brakes, a linkage for interconnecting the wheels and the brakes and the frame at one end of the vehicle and for exerting a vertical force between those wheels and the frame, the direction and magnitude of that force being given by the expression $$I\frac{h}{w}$$

wherein I is the inertia force caused to act on the vehicle by the application of the brakes and regarded as positive if acting towards the other end of the vehicle, $h$ is the height of the center of gravity of the vehicle, and $w$ is the wheelbase of the vehicle, the force acting to move the wheels down with respect to the frame if the expression $$I\frac{h}{w}$$

is positive and to move the wheels up with respect to the frame if the expression is negative.

GAYLORD W. NEWTON.
PAUL HEFTLER.